United States Patent Office 3,478,961
Patented Nov. 18, 1969

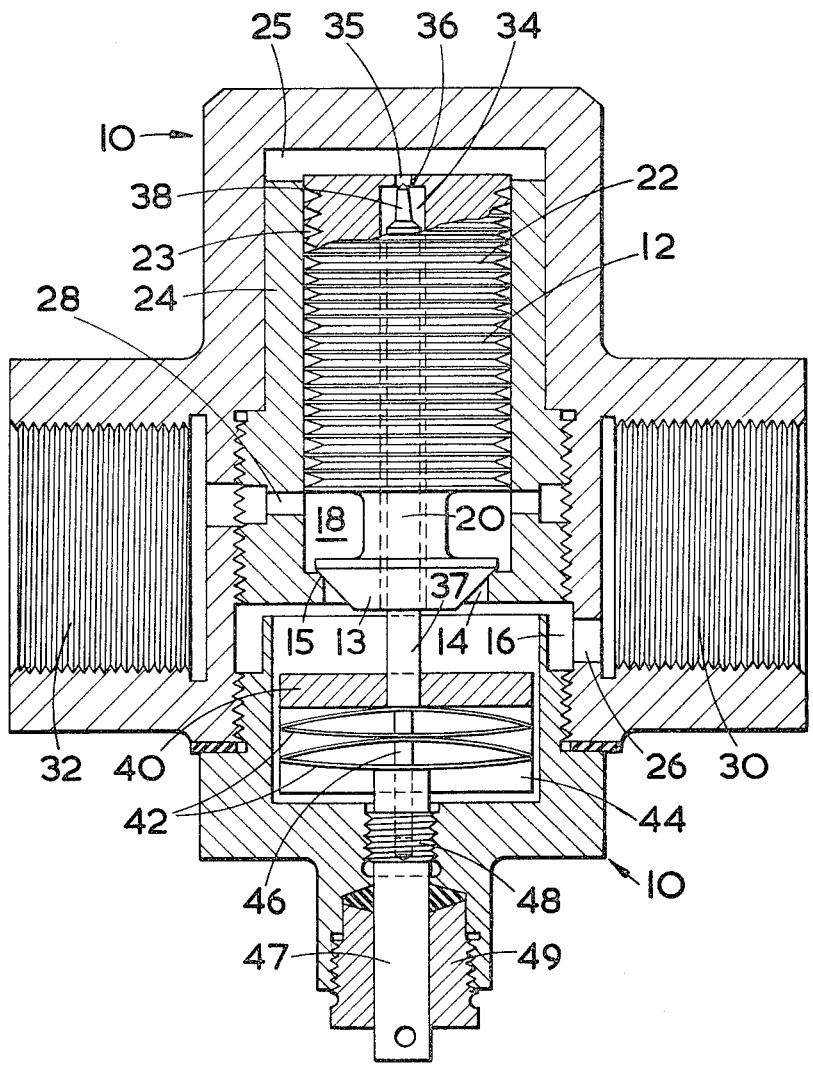

3,478,961
STEAM TRAP
Malcolm Frederick Bradly, Hilltop, Glenvale Road,
Ringwood, Victoria, Australia
Filed Dec. 29, 1967, Ser. No. 694,677
Claims priority, application Australia, Jan. 13, 1967,
16,424/67
Int. Cl. F16t 1/08
U.S. Cl. 236—54                                              9 Claims

ABSTRACT OF THE DISCLOSURE

A steam trap, including a main valve for controlling the flow of fluid through the trap, the main valve having an orifice-type bypass therethrough whose opening is varied by operation of a pilot valve which, in turn, is operated by a thermostat, and the main valve is opened and closed by fluid pressure in the same manner as a thermodynamic steam trap. The thermostat and consequently the pilot valve close or almost close the orifice opening under the influence of cold condensate. When the condensate becomes hot, the pilot valve opens and remains open at all times during the normal operation of the main valve by pressure.

---

This invention relates to steam traps for draining water from steam lines and steam heated apparatus.

The operation of steam traps is based on the different properties of steam and water or mixtures of steam and water as they occur during water drainage of apparatus using steam. For example, thermostatic traps use the difference of temperature between water and steam to cause the deflection of a thermostatic or bimetallic element or a thermostatic bellows to operate appropriate discharge valves. Thermodynamic traps use the different properties of steam, water and steam-water mixtures to operate a valve or valves to cause the discharge of water from the apparatus to be drained.

Other steam traps use the difference in density between water and steam to cause floats to operate valves to give water drainage.

The main purpose of a steam trap is to drain water from steam heated apparatus with the minimum loss of live steam and at a sufficient rate to keep the apparatus supplied with the required quantity of steam.

Thermodynamic traps are used where it is essential for the steam heated apparatus to be full of live steam at all times and, under these conditions, there can sometimes be a loss of live steam. Thermostatic traps can prevent such loss of steam if adjusted to a specific load and steam pressure but, under varying conditions of load and steam pressure may also waste steam or be sluggish in draining the apparatus.

Now this invention has as its principal objective the avoidance of the drawbacks of the thermodynamic and thermostatic traps by combining the principles of both in the one trap. This is achieved in the present invention by providing a steam trap comprising a valve controlling flow of fluid from an entry chamber to a discharge chamber, said valve having a restricted by-pass therethrough and utilizing fluid pressure changes across said by-pass to open and close said valve in the manner of a thermodynamic trap, the restriction of said by-pass being variable by means responsive to a thermostat device subjected to the temperature of fluid entering the trap.

More specifically, the invention provides a steam trap comprising a body having an entry chamber for fluid and a discharge chamber for said fluid, a port connecting said chambers, a main valve controlling fluid flow through said port, said main valve combining a poppet valve co-operating with said port and a piston slidable in a cylinder in said body, said main valve having a passage therethrough restricted by an orifice and utilising fluid pressure changes across said orifice to open and close said main valve whereby the trap functions as a thermodynamic trap, the effective cross-section area of said orifice being variable by means of a pilot valve controlled by a thermostat device subjected to the temperature of fluid entering the trap so as to vary the said orifice in accordance with the said temperature.

One practical arrangement of the invention will now be described, by way of example only, with reference to the accompanying drawing, which is a vertical mid-sectional elevation of my steam trap, and wherein a body 10 accommodates the main valve 12 vertically disposed with a poppet valve portion 13 to control fluid flow through the port 14 situated between the fluid entry chamber 16 and the fluid discharge chamber 18.

The lower portion of the main valve 12 constitutes the poppet valve 13 which is integrally connected by a neck 20, of reduced diameter and of a relatively short length, to the piston 22 which is fractionally larger in diameter than the diameter of a valve seating 15 for the poppet valve 13 in the port 14. The piston 22 can slide freely in a co-operating cylinder 24, leading at its upper end into a closed upper chamber 25 and extending at its lower end to the fluid outlet side of the poppet valve 13.

The fluid discharge chamber 18 is thus formed between the piston 22 and the poppet valve 13, and between the lower end of the cylinder 24 and the reduced diameter neck 20 of the main valve 12.

The piston 22 preferably has a number of circumferental grooves 23 formed in its peripheral surface to increase the fluid pressure drop between the upper and lower ends of the piston.

The poppet valve 13 engages with the seating 15 in the port 14 and, in the raised or open position of the poppet valve, fluid will flow from the underside of the poppet valve (i.e. the entry chamber side of the trap) through the now open port to the discharge chamber 18 of the trap.

The entry chamber 16 and discharge chamber 18 are connected by suitably sized ports 26 and 28 respectively to respective inlet and outlet pipe connections 30 and 32, which are formed in the external part of the body 10.

The main valve 12 has a passage 34 formed through it along its longitudinal (vertical) axis, said passage being reduced in diameter to provide an orifice 35 near the upper end of the piston 22 to form a seat 36 for a needle-type pilot valve 38. The stem 37 of the pilot valve 38 slides loosely in the longitudinal passage 34 and extends into the entry chamber 16.

The lower end of the pilot valve 38 is weighted by a weight 40 to prevent its being carried upwards by fluid pressure.

The lower end of the pilot valve stem 37 rests against a bimetallic thermostat strip or strips 42 arranged so that fluid temperature changes will raise (tend to shut) or lower (tend to open) the pilot valve 38 with respect to its seat 36.

In the arrangement shown, there are two pairs of bimetallic strips 42, each strip being curved and placed concave face to concave face in each pair, the pairs being in series and kept in position by a diametral groove or slot 44 in the underside of the pilot valve weight 40, and also by a spigot extension 46 of the pilot valve stem 37 which passes freely through a hole in the centre of each of the bimetallic strips. The position of the pilot valve 38 in relation to the main valve 12 can be adjusted from outside the trap by means of a screw 47 passing through the lower part of the body 10 and threadably engaged therewith at 48. The upper end of the screw 47 engages with the bimetallic strips 42. A gland 49 seals the screw 47 in the body 10.

In operation, when cool water is present in the entry chamber 16 where the thermostat 42 is located, the action of the thermostat is to raise the pilot valve 38 thus restricting flow of fluid to the upper chamber 25. Fluid pressure in this chamer 25 will therefore be lowered because of fluid escaping past the piston 22 (i.e. between piston and cylinder) to the discharge chamber 18.

Because of the lowered pressure above the piston 22 relative to the higher pressure in the entry chamber 16 acting upwards on the poppet valve 13, the main valve 12 will rise and fluid will flow past the poppet valve to the discharge chamber 18 and from there to the outlet connection 32 of the trap.

This action will be maintained until hot condensate enters the trap, activating the thermostat to open the pilot valve when some of the fluid passing into the upper chamber 25 will flash into steam causing a rise in pressure which will tend to shut the main valve because the area of the top of the piston 22 is, as stated, greater than the area of the seating 15 for the poppet valve 13.

When the condensate temperature is close to that of the temperature of the saturated steam in the apparatus being drained and the trap is adjusted to maintain this condition, then the amount of water which flashes to steam on entering the upper chamber 25 will eventually be sufficient to force down and so close the main valve 12. The main valve will remain closed while sufficient pressure is maintained in the upper chamber 25 by the water entering this chamber flashing to steam. As the condensate entering the trap becomes cooler, less flashing takes place in the upper chamber so that the pressure is reduced and the main valve rises and so opens again.

This action is assisted by the thermostat 42 which tends to restrict the pilot valve orifice 35 more as the condensate becomes cooler.

The action of the trap is thus intermittent when adjusted to pass condensate at close to the saturated steam temperature of the apparatus being drained. However, if the trap is adjusted so that the pilot valve orifice 35 is more widely open or less restricted at this temperature, the main valve will come to a position of equilibrium and remain in a partially open or throttling position and so give a continuous discharge of condensate, a type of action which is often preferred in practice.

When working in this manner, the main valve is held in equilibrium by the fluid pressures acting on both sides of the poppet valve 13 and on both ends of the piston 22. This equilibrium is maintained by some flashing of water to steam in the upper chamber 25 which in turn is dependent on the degree of restriction of the pilot valve orifice 35 due to the action of the thermostat 42.

A change of load leading to a change of condensate temperature or pressure will cause a change in the position of the pilot valve 38 which in turn will lead to a change of pressure in the upper chamber 25 so that the main valve 12 is raised or lowered to suit the loading conditions.

Should there occur a condition where steam and no condensate enters the trap, then the trap will remain closed until such time as sufficient condensate collects to cool the thermostat thus tending to restrict the pilot valve orifice 35 and reduce the pressure in the upper chamber 25, which will then allow the main valve to rise and open the port 14 between the entry chamber 16 and discharge chamber 18.

I claim:

1. A steam trap comprising a valve controlling flow of fluid from an entry chamber to a discharge chamber, said valve having a restricted by-pass therethrough and utilising fluid pressure changes across said by-pass to open and close said valve in the manner of a thermodynamic trap, the restriction of said by-pass being variable by means responsive to a thermostat device subjected to the temperature of fluid entering the trap.

2. A steam trap comprising a body having an entry chamber for fluid and a discharge chamber for said fluid, a port connecting said chambers, a main valve controlling fluid flow through said port, said main valve combining a poppet valve co-operating with said port and a piston slidable in a cylinder in said body, said main valve having a passage therethrough restricted by an orifice and utilising fluid pressure changes across said orifice to open and close said main valve whereby the trap functions as a thermodynamic trap, the effective cross-sectional area of said orifice being variable by means of a pilot valve controlled by a thermostat device subjected to the temperature of fluid entering the trap so as to vary the said orifice in accordance with the said temperature.

3. A steam trap according to claim 2, wherein the main valve is vertically disposed, the orifice gives access to a closed chamber above the piston, the piston is above the poppet valve and joined thereto by an integral neck providing an annular chamber constituting the discharge chamber above the poppet valve, the entry chamber being disposed below the poppet valve and housing the thermostat device.

4. A steam trap according to claim 3, wherein the pilot valve comprises an elongated stem extending through the passage in the main valve and having a pointed upper end co-operating with said orifice to form a needle-type valve, and extending at its lower end into said entry chamber to rest upon said thermostat device.

5. A steam trap according to claim 4, wherein the thermostat device comprises at least two vertically opposed bimetallic strips, each strip being curved and arranged concave face to concave face and having a central guide hole freely fitting upon a spigot extension at the lower end of said stem, the upper strip supporting said stem and the lower strip being supported centrally by an abutment carried by said body.

6. A steam trap according to claim 5, wherein the lower end of the stem carries a weight to prevent the stem being carried upwards by fluid pressure, said weight being diametrally slotted so as to freely straddle the bimetallic strips thereby locating them in congruent opposed relationship.

7. A steam trap according to claim 5, wherein the abutment supporting the lower bimetallic strip is adjustable vertically by screw means extending externally of the body and engaging in a threaded hole in the lower part of said body whereby the operation of the pilot valve responsive to the thermostat device is manually adjustable at will.

8. A steam trap according to claim 6, wherein the abutment supporting the lower bimetallic strip is adjustable vertically by screw means extending externally of the body and engaging in a threaded hole in the lower part of said body whereby the operation of the pilot valve responsive to the thermostat device is manually adjustable at will.

9. A steam trap according to claim 1 wherein a rise in temperature of the fluid flowing through the steam trap opens the pilot valve and hence the restricted bypass through the valve.

References Cited

UNITED STATES PATENTS

| | | | |
|---|---|---|---|
| 668,766 | 2/1901 | Bickel | 236—80 X |
| 688,283 | 12/1901 | Bickel | 236—54 |
| 1,326,898 | 12/1919 | Royle et al. | 236—80 |
| 2,757,870 | 8/1956 | Velan | 236—54 |

FOREIGN PATENTS

| | | |
|---|---|---|
| 595,867 | 4/1960 | Canada. |
| 1,070,480 | 2/1954 | France. |

WILLIAM J. WYE, Primary Examiner

U.S. Cl. X.R.

236—80